A United States Patent Office  
2,845,742  
Patented Aug. 5, 1958

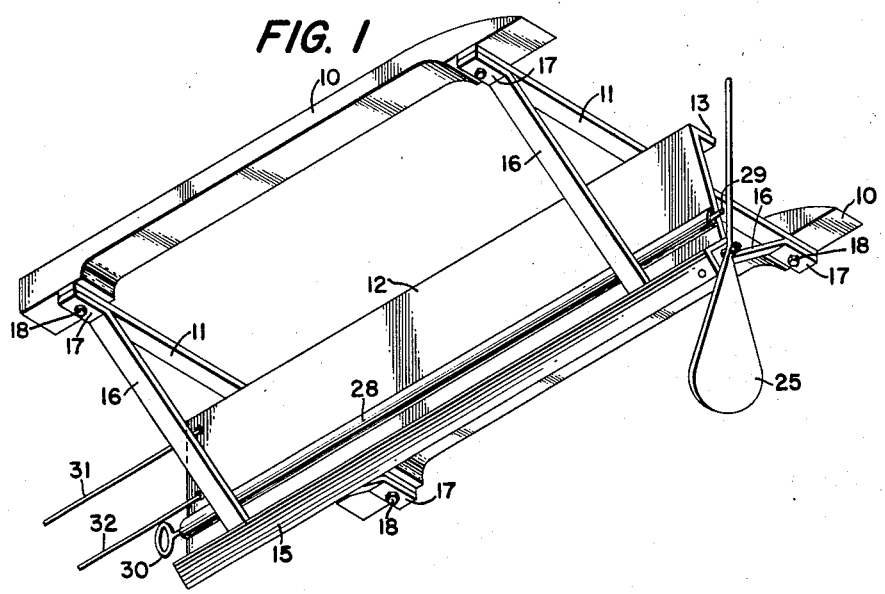
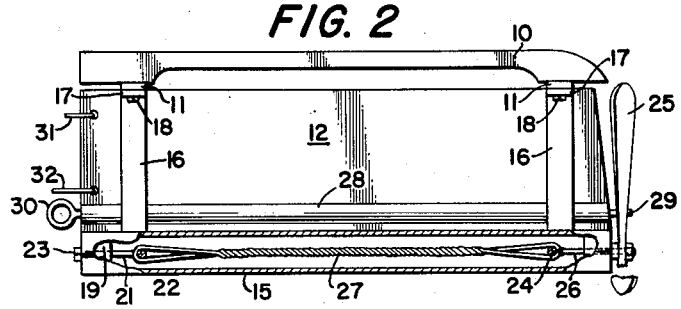
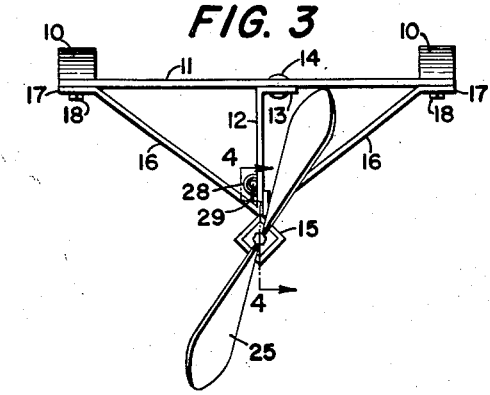
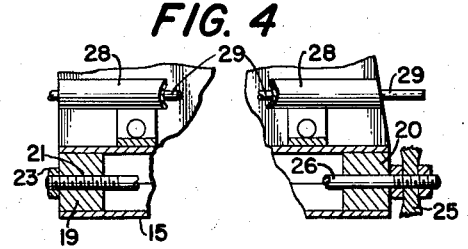
INVENTOR
ELMER N. SKILLMAN

2,845,742  
DEVICE FOR USE BELOW ICE  
Elmer N. Skillman, Rapid City, S. Dak.  
Application March 21, 1955, Serial No. 495,383  
3 Claims. (Cl. 43—26.1)

This invention relates to a device for use below ice.

The object of the invention is to provide a device which can be used for handling lines such as fishing lines, below ice.

Another object of the invention is to provide a mechanism which will permit a fisherman to thread a fishing line from one opening in ice to another opening and whereby bait or lures can be readily moved beneath the ice.

Another object of the invention is to provide a trolling mechanism for use below ice whereby the mechanism can be used by various persons such as fishermen and whereby the mechanism or device can also be used for stringing various type of lines under the ice as for example when hooks are being dragged or when grappling devices are being used in salvage or rescue work or where wires or lines are being laid on the bottom of a frozen lake or pond.

A further object of the invention is to provide a line handling device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view showing the line handling device of the present invention.

Figure 2 is a side elevational view of the line handling device, with parts broken away and in section.

Figure 3 is a front elevational view of the line handling device.

Figure 4 is a sectional view taken on the line 4—4 of Figure 3.

Referring in detail to the drawings, the numeral 10 designates each of a pair of buoyant runners which are adapted to be positioned beneath or below an ice surface, and extending between the pair of buoyant runners 10 and secured thereto, is a pair of spaced parallel horizontally disposed braces 11.

The mechanism of the present invention further includes a fin which is indicated generally by the numeral 12, and the fin 12 includes a major vertically disposed portion and an upper right angularly arranged flange 13, Figure 1. The flange 13 is secured to the pair of braces 11 in any suitable manner, as for example by means of suitable securing elements 14.

Arranged on the lower end of the fin 12 is a rectangular portion 15, for a purpose to be later described. There is further provided a plurality of inclined arms 16, and flanges 17 are arranged on the upper ends of the arms 16 and these flanges 17 are secured to the runners 10 through the medium of securing elements 18.

Positioned in the ends of the rectangular portion 15 are blocks 19 and 20, Figure 2. A bolt 21 extends through the block 19 and has an eye 22 on the front end thereof, and a nut or head 23 is arranged on the rear end of the bolt 21. A bolt 26 extends through the front block 20, and the bolt 26 is provided with an eye or ring 24 on its rear end, there being a propeller 25 mounted on the front end of the bolt 26. A rubber band 27 is positioned within the rectangular portion 15, and one end of the rubber band 27 is connected to the eye 22, while the other end of the rubber band 27 is connected to the eye 24 on the bolt 26. This rubber band provides the propulsion means for the propeller 25.

Connected to the fin 12 or formed integral therewith, is a casing 28 which has a shiftable rod 29 extending longitudinally therethrough. A handle or ring 30 is arranged at the rear end of the rod 29, and the front end of the rod 29 is mounted for movement into and out of the path of the revolving or rotating propeller 25. A pair of spaced apart lines 31 and 32 extend rearwardly from the fin 12 and are secured thereto.

From the foregoing, it is apparent that there has been provided a device which is adapted to travel through a body of water beneath or below a surface of ice. In use, lines such as the lines 31 and 32 are adapted to be connected to the rear end of the fin 12 and the device can then be inserted down through a hole in an ice surface. Then, with the propeller 25 in cocked position, the handle 30 can be used to retract the rod 29 so that with the rubber band 27 in wound condition, the energy from the rubber band 27 will rotate the propeller 25 to thereby move the device through the water below the ice. One of the lines extending rearwardly from the fin may have fish hooks, lures or the like connected thereto. With the rod 29 in the position shown in Figure 2, rotation of the propeller 25 is prevented, but by moving the rod 29 rearwardly by means of the handle 30, the propeller 25 will be free to rotate as the rubber band 27 unwinds.

Thus, it will be seen that there has been provided a device which can be used for moving a line through a body of water under ice and by means of the present invention, a line can be threaded under the ice from one hole in the ice to another hole and such holes may be of any desired distance therebetween such as from 100 feet to 150 feet apart. The device can be used by various persons such as commercial fishermen or seiners. Thus, by threading a line or rope under the ice and attaching such a line to the seine or net which is then pulled into the water by the rope or line, it will be seen that this apparatus can be moved under the ice and dragged along through the water. Furthermore, the device can be used whenever it is desired or required to string a line under the ice, as for example in dragging hooks or grappling devices in salvage or rescue work, or in laying wires or lines on the bottom of a frozen lake or pond. Furthermore, the device can be used by ice fishermen who can string a line under the ice from one hole to another hole and after the line is strung the fishermen can fasten hooks on the line so as to provide a moving bait under the ice. Due to their buoyancy the runners 10 skim along the underside of the ice as the device moves. The propeller 25 is rotated by the rubber band 27 and by winding up the rubber band 27 energy can be stored up in the rubber band. The arms 16 and braces 11 serve to hold the parts in their proper assembled position. The fin 12 acts as a rudder which guides the device in a straight line, and the rod 29 serves to selectively prevent rotation of the propeller. The rod is maintained in its proper position by the guide member or casing 28, and a line may be connected to the handle 30 which can lead back to the hole in the ice.

The device may be placed in the water through a hole in the ice and then can be directed in the desired direction. Then, the rod 29 is released so that the device moves under the ice and pulls the line or rope as the case may be. Then, the operator or user locates the device through the ice and chops a hole at that point so that the operator then has a line extending from his launching hole to the new hole which has been chopped. The bolt 26 is loosely mounted in the block 20 so that this bolt can rotate.

Due to the buoyancy of the runners 10 the device skims along the underside of the ice with the runners 10 engaging the ice. The propeller 25 is adapted to be wound up manually. The blocks 19 and 20 may be secured in the rectangular portion 15 in any suitable manner. The line 31 leads back to the hole in the ice, while the line 32 is a fishing line for use in trolling.

As previously stated, the device is adapted to be placed in the water through a hole in the ice and then is directed in the desired direction. By releasing the rod 29, the device will move under the ice so as to pull the line or rope. Then, the operator locates the device through the ice and chops a hole at that point so that the operator then has a line extending from the launching hole to the hole that has been chopped.

I claim:

1. In a device for movement through water below a frozen surface, a pair of spaced apart buoyant runners, a fin arranged parallel to the longitudinal axis of said runners and said fin including a major portion that is vertically disposed, a flange extending transversely from the upper end of said major portion of the fin, a pair of horizontally disposed spaced parallel braces extending between said runners and secured thereto, and said flange being secured to said braces intermediate the ends thereof, a rectangular portion on the lower end of said fin, a pair of spaced apart blocks mounted in the ends of said rectangular portion, a bolt extending through each of said blocks, a resilient band extending between said bolts and connected thereto, a propeller connected to the front bolt, a casing on said fin arranged above said rectangular portion, a shiftable rod extending through said casing and including a handle on the rear end thereof, the front end of said rod being mounted for movement into and out of the path of said propeller, inclined arms extending between said fin and runners and secured thereto, and a pair of spaced apart lines extending rearwardly from said fin.

2. In a device for movement through a body of water below an ice surface, buoyant runners positioned below the ice surface, arms depending from said runners, a fin connected to said arms, power means for moving the device through the water below the ice surface, and lines extending rearwardly from said fin and connected thereto.

3. In a device for movement through water below a frozen surface, a pair of buoyant runners, a fin including a major portion that is vertically disposed, a flange extending from the upper end of said major portion of the fin, a pair of braces extending between said runners and secured thereto, said flange being secured to said braces intermediate the ends thereof, a rectangular portion on said fin, a pair of blocks mounted in said rectangular portion, a bolt extending through each of said blocks, a resilient band extending between said bolts and connected thereto, a propeller connected to the front bolt, a casing on said fin, a shiftable rod extending through said casing and including a handle on the rear end thereof, the front end of said rod being mounted for movement into and out of the path of said propeller, arms extending between said fin and runners and secured thereto, and a pair of lines extending rearwardly from said fin.

References Cited in the file of this patent

UNITED STATES PATENTS

| | | |
|---|---|---|
| 956,533 | Krause | Aug. 3, 1910 |
| 2,420,451 | Spenard | May 13, 1947 |
| 2,487,229 | Finn | Nov. 8, 1949 |
| 2,520,562 | Peeler | Aug. 29, 1950 |
| 2,572,427 | Anglim | Oct. 23, 1951 |
| 2,597,288 | Caldwell | May 20, 1952 |
| 2,648,929 | Dunn | Aug. 18, 1953 |